(No Model.)
G. H. GRIFFIN.
NUT LOCK.
No. 394,537. Patented Dec. 11, 1888.
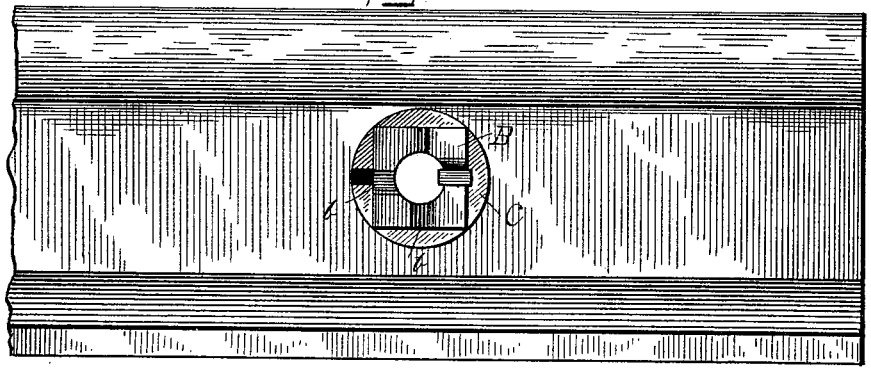
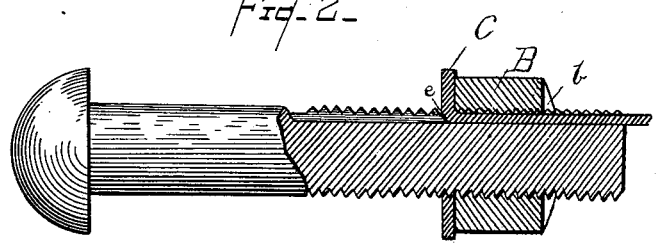
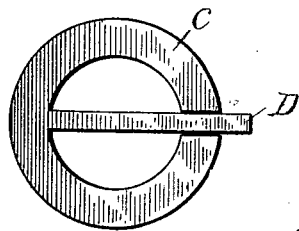
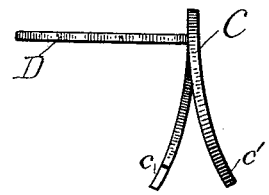
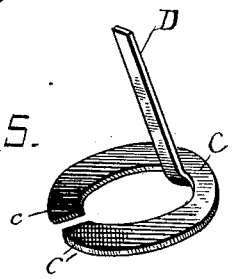
Witnesses.
E. C. Duffy
C. M. Werle
Inventor.
Geo. H. Griffin
By his Attorney

UNITED STATES PATENT OFFICE.

GEORGE H. GRIFFIN, OF ABINGDON, VIRGINIA.

NUT-LOCK.

SPECIFICATION forming part of Letters Patent No. 394,537, dated December 11, 1888.

Application filed February 27, 1888. Serial No. 265,357. (No model.)

*To all whom it may concern:*

Be it known that I, GEORGE H. GRIFFIN, of Abingdon, in the county of Washington and State of Virginia, have invented certain new and useful Improvements in Nut-Locks; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in those nut-locks in which the nut is locked against loosening by a pin.

The object of my invention is to provide a nut-lock which shall overcome the objectionable features of the nut-locks heretofore in use, and which shall be extremely simple, being preferably composed of but three pieces of metal—*i. e.*, the bolt, the nut, and the washer—and which is very cheap and easy of manufacture and can be put together by any person, and yet will be more durable and effective when put to use than those heretofore constructed; and a further object is to provide a washer provided with a locking-tongue, said washer and tongue being stamped out of a single piece of metal, having the locking-tongue across and beyond the periphery of the washer, which is preferably spring-steel.

With these ends in view my invention consists in certain novel features of construction and combinations of parts, more fully described hereinafter, and particularly pointed out in the claim.

Referring to the accompanying drawings, Figure 1 is a side elevation of a portion of a railroad-track, showing my improved nut-lock. Fig. 2 is a side elevation of a bolt, nut, and the washer and locking-tongue, the nut, washer, and tongue being shown in section, the tongue shown in position ready to be bent over into one of the grooves or slots in the nut to lock the same firmly in position. Fig. 3 is a plan view of the washer and locking-tongue just as they are cut from a sheet of metal before the tongue is bent upwardly. Fig. 4 is a side view of the spring-washer and its locking-tongue, and Fig. 5 is a perspective view of the same.

In the drawings, the reference-letter A indicates any suitable bolt, which is provided with a longitudinal groove, *a*, extending the length of its threaded portion, as shown by the sectional portion of the bolt in Fig. 2. A nut, B, is provided to screw upon the threaded portion of the bolt, and the nut can be of any external contour desired; but it is preferably provided with the radially-extending slots or grooves *b* in its outer face, for the purpose hereinafter set forth. The grooves have inclined sides, so that the tongue will slip over in one direction, while it will lock in the opposite direction. Of course it will be arranged to suit either a right or left hand screw. A washer, C, preferably, although not necessarily, circular in form and provided with a central aperture for the admission of the bolt, is used, and said washer is provided with an upwardly-extending locking-tongue, D, formed integral with the same. Thus it will be readily observed that in assembling the parts of the nut-lock the washer is first slipped upon the threaded end of the bolt, with its locking-tongue extending outwardly and resting in the longitudinal groove in the bolt, which groove should be of such depth that the outer side or face of the locking-tongue will lie beneath the edges of the groove, so that the nut can screw freely upon the bolt when the tongue is in the position shown in Fig. 2. The nut is then screwed in position tightly down upon the washer, and the end of the tongue is bent over into one of the slots in the outer face of the nut, (see Fig. 1,) thus forming an extremely tight and rigid lock that cannot be jarred or forced loose.

The washer and locking-tongue are preferably stamped out of a single piece of sheet metal or steel by a die which will cut a blank of the form shown in Fig. 3, in which the tongue extends from the edge of the central aperture of the washer transversely across said central aperture and through the opposite side, leaving the washer provided with the two spring ends *c c'*, which are so formed that they spring or exert their pressure in opposite directions, as clearly shown in Fig. 4.

After the blank shown in Fig. 3 has been formed the tongue is bent upwardly from between the spring ends of the washer at or about right angles to the plane of the washer, and in such a manner that its end which adjoins the washer shall curve outwardly, as shown at e, Fig. 2, so that the tongue can fit snugly into the groove in the bolt.

It is evident that any other suitable metal than steel can be used in the manufacture of the washer and locking-tongue; but it is preferred to use that metal, as steel is so much more durable and has more elasticity than other metals, and it is manufactured and sold at such low rates at the present time that the cost will not be much, if any, greater.

It is evident that by forming the ends of the washer to spring in opposite directions the efficiency of the device is greatly increased, for one of the ends will bear with considerable force upon the face of one of the substances clamped together, and the opposite end will bear against the nut and hold it tightly locked against the bent-over end of the tongue. It is also evident that slight changes might be made in the form and arrangement of the parts described without departing from the spirit and scope of my invention; hence I do not wish to limit myself strictly to the precise construction herein set forth, but consider myself entitled to all such slight changes.

Having thus fully described my invention, what I claim, and desire to secure by Letters Patent of the United States, is—

In a nut-lock, the combination, with a bolt provided with a longitudinal groove in its threaded portion and a nut to fit said bolt, of a washer provided with a locking-tongue formed of a single piece of metal, said locking-tongue extending across the bore and periphery of the washer, the free ends being bent to form springs and the tongue being adapted to rest in the grooves of the bolt, and its outer end bent to fit in notches in the outside face of the nut, substantially as described.

In testimony that I claim the foregoing as my own I affix my signature in presence of two witnesses.

GEORGE H. GRIFFIN.

Witnesses:
O. E. DUFFY,
HUBERT E. PECK.